(12) United States Patent
Heo

(10) Patent No.: US 11,702,046 B1
(45) Date of Patent: Jul. 18, 2023

(54) ONE-PEDAL CONTROL METHOD AND SYSTEM FOR AUTONOMOUS VEHICLE

(71) Applicants: Hyundai Motor Company, Seoul (KR); Kia Corporation, Seoul (KR)

(72) Inventor: Jae Sung Heo, Uiwang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/946,998

(22) Filed: Sep. 16, 2022

(30) Foreign Application Priority Data

Mar. 23, 2022 (KR) ........................ 10-2022-0035932

(51) Int. Cl.
| | |
|---|---|
| B60K 26/00 | (2006.01) |
| B60T 7/04 | (2006.01) |
| B60T 7/06 | (2006.01) |
| B60W 60/00 | (2020.01) |
| G05G 1/30 | (2008.04) |
| B60K 26/02 | (2006.01) |

(52) U.S. Cl.
CPC ............... *B60T 7/06* (2013.01); *B60K 26/02* (2013.01); *B60T 7/042* (2013.01); *B60W 60/0018* (2020.02); *B60W 60/00133* (2020.02); *B60W 60/00186* (2020.02); *G05G 1/30* (2013.01); *B60K 2026/026* (2013.01)

(58) Field of Classification Search
CPC .. G05G 1/30; B60T 7/042; B60T 7/06; B60K 2026/026; B60W 60/0018; B60W 60/00186
USPC .................................. 701/110; 477/9, 27, 29
See application file for complete search history.

(56) References Cited

U.S. PATENT DOCUMENTS

2021/0362718 A1* 11/2021 Ikenori ................. B60W 10/04

FOREIGN PATENT DOCUMENTS

KR 10-2017-0137427 12/2017

\* cited by examiner

*Primary Examiner* — Erick R Solis
(74) *Attorney, Agent, or Firm* — Morgan, Lewis & Bockius LLP

(57) ABSTRACT

A one-pedal control method and system for an autonomous vehicle, are capable of accelerating or decelerating a vehicle by use of a foldable brake pedal system when a foldable accelerator pedal system is broken down when a driver manually drives the vehicle or the mode is switched from an autonomous driving mode to a manual driving mode, and capable of implementing a fail-safe function by use of an integrated safety function of software.

20 Claims, 5 Drawing Sheets

ONE-PEDAL CONTROL METHOD AND SYSTEM FOR AUTONOMOUS VEHICLE

CROSS REFERENCE TO RELATED APPLICATION

The present application claims priority to Korean Patent Application No. 10-2022-0035932, filed Mar. 23, 2022, the entire contents of which is incorporated herein for all purposes by this reference.

BACKGROUND OF THE PRESENT DISCLOSURE

Field of the Present Disclosure

The present disclosure relates to a one-pedal control method and system for an autonomous vehicle, and more particularly, to a technology related to a one-pedal control method and system for an autonomous vehicle, which are capable of accelerating or decelerating a vehicle by use of a foldable brake pedal system when a foldable accelerator pedal system is broken down.

Description of Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal. Recently, the autonomous vehicle is actively developed.

In a case in which an autonomous driving situation is universally implemented, the driver may select a manual driving mode in which the driver directly drives the vehicle and an autonomous driving mode in which the driver does not directly drive the vehicle and the vehicle autonomously travels to the destination.

It is necessary to enable the driver to take a rest comfortably with his feet stretched in the autonomous driving mode. If pedals (an accelerator pedal and a brake pedal) positioned in a lower space of a driver seat are kept exposed to the interior of the vehicle in the autonomous driving mode, the pedals disturb the driver's relaxation. If a pad of a pedal device is erroneously manipulated regardless of the driver's intention, there is a high concern that autonomous driving is forcibly stopped, which may cause an accident.

Therefore, a foldable pedal device for an autonomous vehicle is actively developed, in which the pad of the pedal device is exposed to protrude toward the driver so that the driver may manipulate the pad in the manual driving mode in which the driver directly drives the vehicle, and the pad of the pedal device is hidden so as not to protrude toward the driver in the autonomous driving mode so that the pad cannot be manipulated by the driver, ensuring the driver's comfortable relaxation and implementing safety by preventing an erroneous manipulation.

A state in which the foldable pedal device is exposed to protrude toward the driver to allow the driver's manual driving is referred to as a pop-up state, and a state in which the foldable pedal device is hidden so as not to protrude toward the driver in the autonomous driving situation is referred to as a hide state.

The foldable pedal device provided in the autonomous vehicle includes a foldable accelerator pedal system and a foldable brake pedal system. The foldable accelerator pedal system and the foldable brake pedal system are typically configured to simultaneously pop up or hide.

The foldable accelerator pedal system and the foldable brake pedal system each include a pedal or pad configured to be manipulated by the driver, an actuator or motor configured to provide power for performing a foldable function, a sensor, and a control logic for performing the foldable function.

Meanwhile, in a case in which any one of the foldable accelerator pedal system and the foldable brake pedal system is broken down, the driver needs to accelerate or brake the vehicle by manipulating the other pedal system which is not broken down. The above-mentioned system is referred to as a one-pedal system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a one-pedal control method and system for an autonomous vehicle, which are configured for accelerating or decelerating a vehicle by use of a foldable brake pedal system when a foldable accelerator pedal system is broken down. The present disclosure also aims to implement a fail-safe function by utilizing an integrated safety function of software instead of doubly configuring hardware to ensure redundancy, reducing the number of components and costs, ensuring convenience of use, and improving marketability.

To achieve the above-mentioned object, various aspects of the present disclosure are directed to providing a one-pedal control method for an autonomous vehicle, the one-pedal control method including: a breakdown diagnosis step of performing breakdown diagnosis on a foldable accelerator pedal system and a foldable brake pedal system when a driver manually drives the autonomous vehicle currently or a mode of the autonomous vehicle is switched from an autonomous driving mode to a manual driving mode; an autonomous driving determination step of determining whether autonomous driving of the autonomous vehicle is possible when it is determined that the foldable accelerator pedal system is broken down and the foldable brake pedal system is normal; a one-pedal activating step of activating a one-pedal system using the foldable brake pedal system when a result of the determining in the autonomous driving determination step indicates that the autonomous driving is impossible; and a one-pedal control step of manipulating, by the driver, a foldable brake pedal and controlling the traveling of the vehicle after the one-pedal system using the foldable brake pedal system is activated, in which the one-pedal control step is a one-pedal deceleration mode in which the vehicle decelerates or brakes in response that the driver presses and manipulates the foldable brake pedal, and a vehicle speed increases and the vehicle accelerates in response that the driver eliminates an operating force to the foldable brake pedal.

The breakdown of the foldable accelerator pedal system and the foldable brake pedal system may include one or more of mechanical defects of hardware including a pedal and a motor, errors of functions of a sensor, and errors of software for controlling a foldable function of the foldable accelerator pedal system and the foldable brake pedal system.

When a result of the diagnosis in the breakdown diagnosis step indicates that both the foldable accelerator pedal system and the foldable brake pedal system are normal, the vehicle may be normally kept in the manual driving mode or the mode may be normally switched to the manual driving mode, and control logic may be ended.

When a result of the determining in the autonomous driving determination step indicates that the autonomous driving is possible, the vehicle may move in an autonomous driving state to a safety zone, and then control logic may be ended.

When a result of the determining in the autonomous driving determination step indicates that the autonomous driving is impossible, the vehicle may travel in a one-pedal deceleration mode state using the foldable brake pedal system and move to a safety zone, and then control logic may be ended.

The one-pedal control method may include: a check step of checking whether a smart cruise control system is usable before the one-pedal control step is performed after the one-pedal activating step; and a setting step of determining a traveling safety speed and setting the smart cruise control system to the determined traveling safety speed when a result of the checking indicates that the smart cruise control system is usable, and when the setting of the smart cruise control system is completed, the one-pedal deceleration mode may be performed, in which the vehicle decelerates or brakes in response that the driver presses and manipulates the foldable brake pedal, and the vehicle speed increases and the vehicle accelerates in response that the driver eliminates the operating force.

The traveling safety speed in the setting step may be a speed limit automatically determined by an autonomous driving controller of the vehicle in consideration of one or more of a road condition, a speed of a peripheral vehicle, and a weather situation.

When a result of the checking in the check step indicates that the smart cruise control system is not usable, a one-pedal acceleration mode using the foldable brake pedal may be performed, and the one-pedal acceleration mode may be a mode in which the vehicle speed increases and the vehicle accelerates in response that the driver presses and manipulates the foldable brake pedal, and the vehicle decelerates or brakes in response that the driver eliminates the operating force.

A pedal effort of the foldable brake pedal system may be decreased to a level of a pedal effort of the foldable accelerator pedal system when the pedal effort of the foldable brake pedal system is adjustable when the one-pedal acceleration mode is performed.

Control logic may be ended after the vehicle travels in the one-pedal acceleration mode state and moves to a safety zone.

Furthermore, various aspects of the present disclosure are directed to providing a one-pedal control method for an autonomous vehicle, the one-pedal control method including: a breakdown diagnosis step of performing breakdown diagnosis on a foldable accelerator pedal system and a foldable brake pedal system when a driver manually drives the autonomous vehicle currently or a mode of the autonomous vehicle is switched from an autonomous driving mode to a manual driving mode; an autonomous driving determination step of determining whether autonomous driving of the autonomous vehicle is possible when it is determined that the foldable accelerator pedal system is broken down and the foldable brake pedal system is normal; a one-pedal activating step of activating a one-pedal system using the foldable brake pedal system when a result of the determining in the autonomous driving determination step indicates that the autonomous driving is impossible; and a one-pedal control step of manipulating, by the driver, a foldable brake pedal and controlling the traveling of the vehicle after the one-pedal system using the foldable brake pedal system is activated, in which the one-pedal control step is a one-pedal acceleration mode in which a vehicle speed increases and the vehicle accelerates when the driver presses and manipulates the foldable brake pedal, and the vehicle decelerates and brakes when the driver eliminates an operating force.

The breakdown of the foldable accelerator pedal system and the foldable brake pedal system may include one or more of mechanical defects of hardware including a pedal and a motor, errors of functions of a sensor, and errors of software for controlling a foldable function of the foldable accelerator pedal system and the foldable brake pedal system.

When a result of the diagnosis in the breakdown diagnosis step indicates that both the foldable accelerator pedal system and the foldable brake pedal system are normal, the vehicle may be normally kept in the manual driving mode or the mode may be normally switched to the manual driving mode, and control logic may be ended.

When a result of the determining in the autonomous driving determination step indicates that the autonomous driving is possible, the vehicle may move in an autonomous driving state to a safety zone, and then control logic may be ended.

When a result of the determining in the autonomous driving determination step indicates that the autonomous driving is impossible, the vehicle may travel in a one-pedal acceleration mode state using the foldable brake pedal system and move to a safety zone, and then control logic may be ended.

A pedal effort of the foldable brake pedal system may be decreased to a level of a pedal effort of the foldable accelerator pedal system when the pedal effort of the foldable brake pedal system is adjustable when the one-pedal acceleration mode is performed.

Furthermore, various aspects of the present disclosure are directed to providing a one-pedal control system for an autonomous vehicle, the one-pedal control system including: a foldable pedal controller configured to receive a request to check whether the system is abnormal from an autonomous driving controller when the driver manually drives the vehicle currently or when the mode is switched from the autonomous driving mode to the manual driving mode, the foldable pedal controller being configured to transmit a result of breakdown diagnosis for the foldable accelerator pedal system and the foldable brake pedal system to the autonomous driving controller, in which when a result of the diagnosis indicates that the foldable accelerator pedal system is broken down and the foldable brake pedal system is normal, the autonomous driving controller is configured to determine whether autonomous driving of the autonomous vehicle is possible, in which when a result of determining whether the autonomous driving of the vehicle is possible indicates that the autonomous driving is impossible, the one-pedal system is activated by use of the foldable brake pedal system, and in which when a result of determining whether the autonomous driving of the vehicle is possible indicates that the autonomous driving is possible, the mode of the vehicle is switched to the autonomous driving mode or the autonomous driving mode is maintained.

The breakdown of the foldable accelerator pedal system and the foldable brake pedal system may include one or more of mechanical defects of hardware including a pedal and a motor, errors of functions of a sensor, and errors of software for controlling a foldable function of the foldable accelerator pedal system and the foldable brake pedal system.

The one-pedal system using the foldable brake pedal system may be a one-pedal deceleration mode in which the vehicle decelerates or brakes in response that the driver presses and manipulates the foldable brake pedal, and the vehicle speed increases and the vehicle accelerates in response that the driver eliminates the operating force.

The one-pedal system using the foldable brake pedal system may be a one-pedal acceleration mode in which the vehicle speed increases and the vehicle accelerates in response that the driver presses and manipulates the foldable brake pedal, and the vehicle decelerates or brakes in response that the driver eliminates the operating force.

According to the one-pedal control method and system for an autonomous vehicle according to an exemplary embodiment of the present disclosure, in the case in which the foldable accelerator pedal system is broken down when the driver manually drives the vehicle or when the mode is switched from the autonomous driving mode to the manual driving mode, the driver may accelerate or decelerate the vehicle by use of the foldable brake pedal system. Therefore, it is possible to implement the fail-safe function by utilizing the integrated safety function of software instead of doubly configuring hardware to ensure redundancy, reducing the number of components and costs, ensuring convenience of use, and improving marketability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
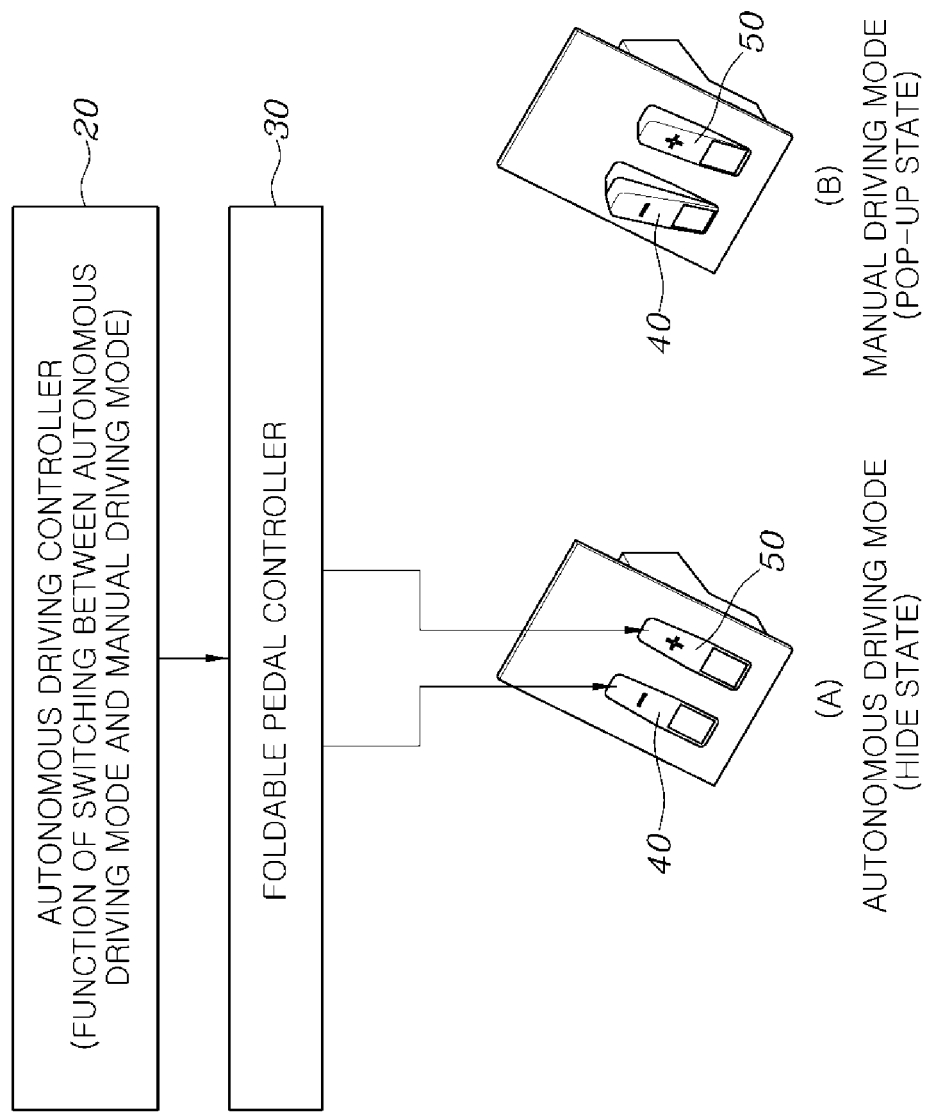
FIG. 1 and FIG. 2 are a schematic configuration view and a block diagram for explaining a one-pedal control method and system for an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure included in the present specification or application are exemplified only for explaining the embodiments according to an exemplary embodiment of the present disclosure, the exemplary embodiments of the present disclosure may be conducted in various forms, and it may not be interpreted that the present disclosure is limited to the embodiments described in the present specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements may not be limited by these terms. These terms are used only for distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for describing various exemplary embodiments and are not intended to limit the present disclosure. Singular expressions include plural expressions unless clearly described as different meanings in the context. In the present specification, it should be understood that the terms "includes," "including," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in commonly used dictionaries should be interpreted as having meanings consistent with meanings in the context of related technologies and may not be interpreted as ideal or excessively formal meanings unless explicitly defined in the present specification.

A control unit (controller) according to various exemplary embodiments of the present disclosure may be implemented by a non-volatile memory configured to algorithm for controlling operations of various constituent elements in a vehicle or store data related to software commands for executing the algorithm, and by a processor configured to perform the following operations by use of the data stored in the corresponding memory. In the instant case, the memory and the processor may be implemented as separate chips. Alternatively, the memory and the processor may be implemented as a single chip in which the memory and the processor are integrated. The processor may be configured in a form of one or more processors.

Hereinafter, a one-pedal control method for an autonomous vehicle according to various exemplary embodiments of the present disclosure will be described with reference to FIG. 1, FIG. 2, and FIG. 3.

An autonomous vehicle may select a manual driving mode in which the driver directly drives the vehicle and an autonomous driving mode in which the driver does not directly drive the vehicle and the vehicle autonomously travels to the destination.

Figure 2:
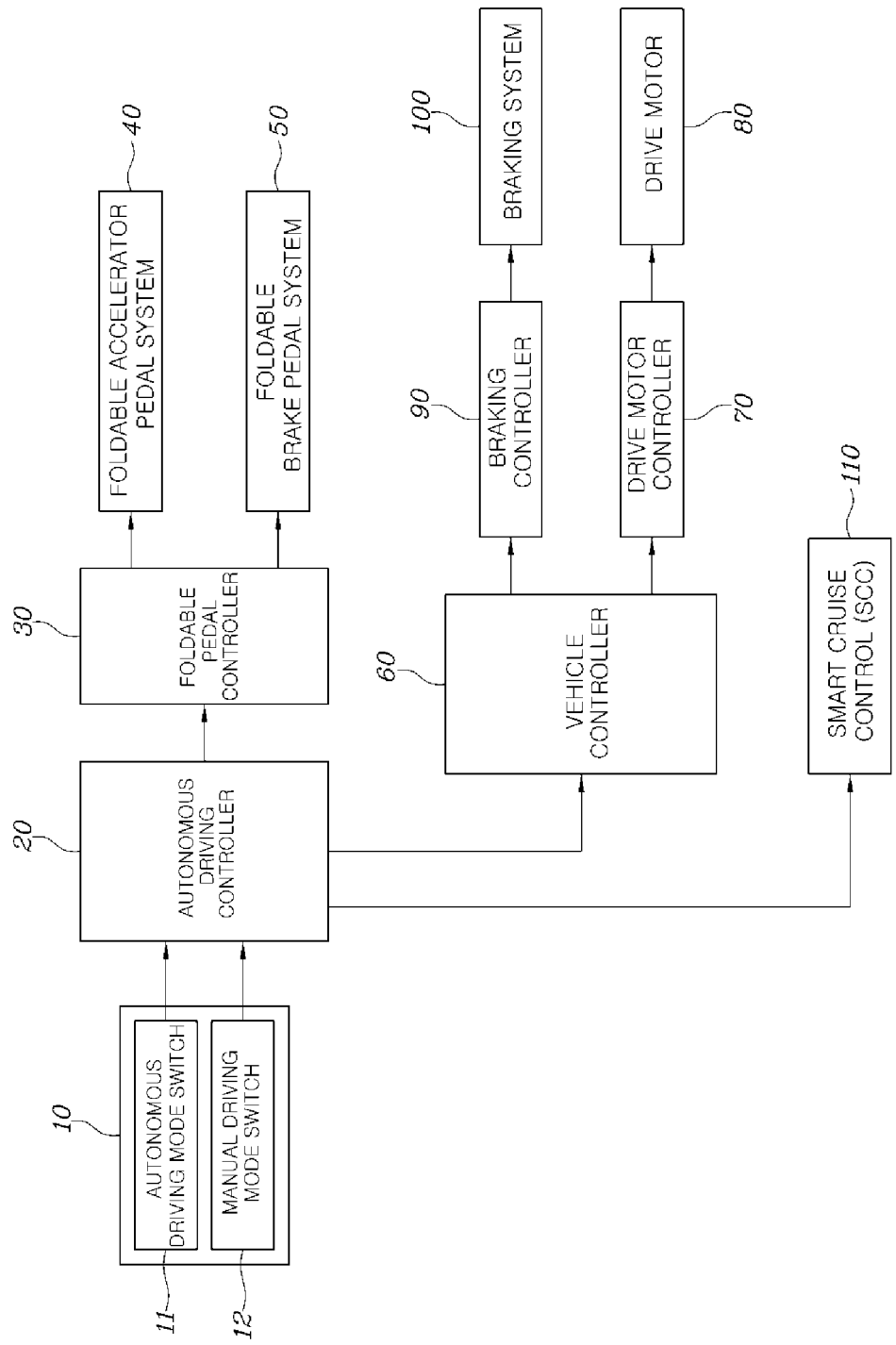

As illustrated in FIGS. 1 to 2, the driver may select the autonomous driving mode or the manual driving mode of the vehicle by manipulating a driving mode switch 10.

The driving mode switch 10 may include an autonomous driving mode switch 11 and a manual driving mode switch 12 which are independently provided and configured so that the driver may manipulate the autonomous driving mode switch 11 and the manual driving mode switch 12.

As an exemplary embodiment of the present disclosure, the driving mode switch 10 may be configured as a single switch configured so that the autonomous driving mode is performed when the driver manipulates the driving mode switch 10 once, and the manual driving mode is performed when the driver manipulates the driving mode switch 10 once again.

The driving mode switch 10 may be provided at the periphery of a driver seat to allow the driver to easily manipulate the driving mode switch 10. In the autonomous vehicle, the driving mode switch 10 may be positioned on a seat of the driver seat, as necessary.

When the driver manipulates the autonomous driving mode switch 11 or the manual driving mode switch 12, an operating signal is transmitted to an autonomous driving controller 20. The autonomous driving controller 20 transmits a control signal to a foldable pedal controller 30, and a foldable accelerator pedal system 40 and a foldable brake pedal system 50 operates to pop up or hide under the control of the foldable pedal controller 30.

When an autonomous driving mode signal is generated as the driver manipulates the autonomous driving mode switch 11, both the foldable accelerator pedal system 40 and the foldable brake pedal system 50 are controlled in operation by the autonomous driving controller 20 so that the foldable accelerator pedal system 40 and the foldable brake pedal system 50 are in a hide state (state A in FIG. 1).

Furthermore, when a manual driving mode signal is generated as the driver manipulates the manual driving mode switch 12, both the foldable accelerator pedal system 40 and the foldable brake pedal system 50 are controlled in operation by the autonomous driving controller 20 so that the foldable accelerator pedal system 40 and the foldable brake pedal system 50 are in a pop-up state (state B in FIG. 1).

The foldable accelerator pedal system 40 and the foldable brake pedal system 50 are provided and positioned in a lower space of the driver seat so that the driver manipulates the foldable accelerator pedal system 40 and the foldable brake pedal system 50 with his or her foot.

To ensure the driver's comfortable relaxation and implement safety by preventing an erroneous manipulation in the autonomous driving mode, the foldable accelerator pedal system 40 and the foldable brake pedal system 50 need to be in the hide state in which the foldable accelerator pedal system 40 and the foldable brake pedal system 50 are not exposed to the driver. Therefore, the pedal device needs to be hidden so as not to protrude toward the driver.

Furthermore, in the manual driving mode in which the driver drives the vehicle, the driver manipulates the foldable accelerator pedal system 40 and the foldable brake pedal system 50 with his or her foot. To the present end, the foldable accelerator pedal system 40 and the foldable brake pedal system 50 need to pop up to be exposed toward the driver.

When the driver manipulates the foldable accelerator pedal system 40 in the manual driving mode situation in which both the foldable accelerator pedal system 40 and the foldable brake pedal system 50 pop up, the autonomous driving controller 20 transmits a control signal to a vehicle controller 60. The vehicle controller 60 transmits a control signal to a drive motor controller 70 and operates a drive motor 80 provided in the vehicle so that the vehicle accelerates.

Furthermore, when the driver manipulates the foldable brake pedal system 50 in the manual driving mode situation in which both the foldable accelerator pedal system 40 and the foldable brake pedal system 50 pop up, the autonomous driving controller 20 transmits a control signal to the vehicle controller 60. The vehicle controller 60 transmits a control signal to a braking controller 90 and operates a braking system 100 provided in the vehicle so that the vehicle brakes.

A one-pedal control system for an autonomous vehicle according to an exemplary embodiment of the present disclosure includes the foldable pedal controller 30 configured to receives a request to check whether the system is abnormal from the autonomous driving controller 20 when the driver manually drives the vehicle currently or when the mode is switched from the autonomous driving mode to the manual driving mode. The foldable pedal controller 30 transmits a result of breakdown diagnosis for the foldable accelerator pedal system 40 and the foldable brake pedal system 50 to the autonomous driving controller 20. When the result of the diagnosis indicates that the foldable accelerator pedal system 40 is broken down and the foldable brake pedal system 50 is normal, the autonomous driving controller 20 determines whether the autonomous driving of the autonomous vehicle is possible. When a result of determining whether the autonomous driving of the vehicle is possible indicates that the autonomous driving is impossible, the one-pedal system is activated by use of the foldable brake pedal system 50. When a result of determining whether the autonomous driving of the vehicle is possible indicates that the autonomous driving is possible, the mode of the vehicle is switched to the autonomous driving mode or the autonomous driving mode is maintained.

In the case of the one-pedal system using the foldable brake pedal system 50, a one-pedal deceleration mode may be performed in which the vehicle decelerates or brakes when the driver presses and manipulates the foldable brake pedal 50, and the vehicle speed increases and the vehicle accelerates when the driver eliminates the operating force.

As an exemplary embodiment of the present disclosure, in the case of the one-pedal system using the foldable brake pedal system 50, a one-pedal acceleration mode may be performed in which the vehicle speed increases and the vehicle accelerates when the driver presses and manipulates the foldable brake pedal 50, and the vehicle decelerates or brakes when the driver eliminates the operating force.

Figure 3:
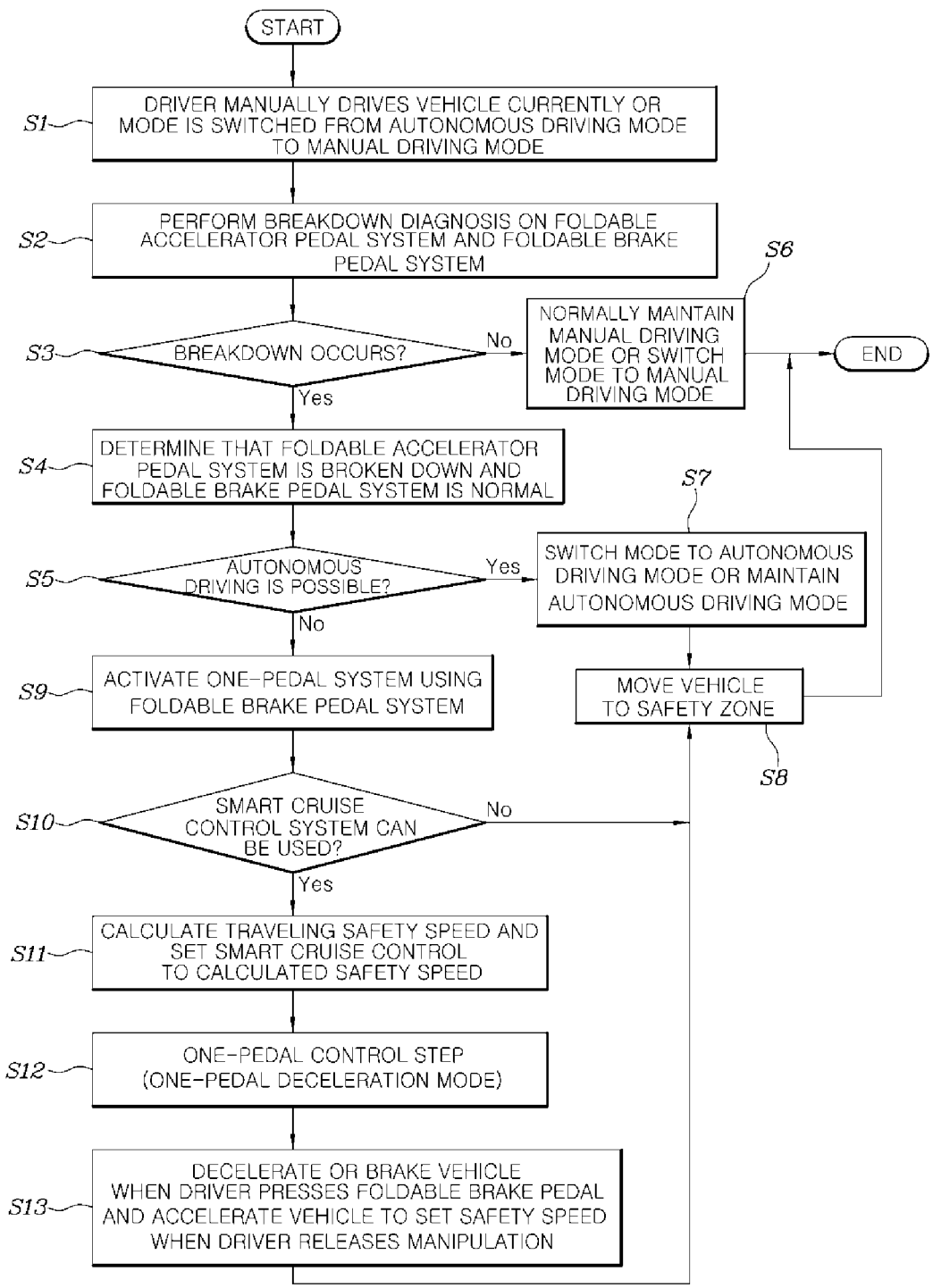
FIG. 3, FIG. 4, and FIG. 5 are flowcharts for explaining control methods for respective embodiments according to an exemplary embodiment of the present disclosure.

FIG. 3 is a flowchart for explaining a one-pedal control method for an autonomous vehicle according to various exemplary embodiments of the present disclosure.

As illustrated, when the driver manually drives the vehicle currently or when the mode is switched from the autonomous driving mode to the manual driving mode (step S1), the foldable pedal controller 30 performs a breakdown diagnosis step (step S2) of performing breakdown diagnosis on the foldable accelerator pedal system 40 and the foldable brake pedal system 50 in response to the request from the autonomous driving controller 20 and transmits the result of the breakdown diagnosis to the autonomous driving controller 20.

In step S3, when the result of the breakdown diagnosis indicates that the foldable accelerator pedal system 40 is broken down and the foldable brake pedal system 50 is normal (step S4), in an autonomous driving determination step (step S5), it is determined whether the autonomous driving of the autonomous vehicle is possible.

The autonomous driving determination step (step S5) is performed by the autonomous driving controller 20 of the vehicle.

The breakdown of the foldable accelerator pedal system 40 and the foldable brake pedal system 50 may include one or more of mechanical defects of hardware including the pedal or pad configured to be manipulated by the driver's foot and the actuator or motor configured to provide power for performing the foldable function, errors of functions of the sensor, and errors of software for controlling the foldable function.

The mechanical defects of hardware may include trapping or adhesion of operation mechanisms, defects of the pop-up and hiding operations, and the like. The errors of sensor functions may include stroke sensing defects of the pedal.

When the result of the determination in step S3 indicates that both the foldable accelerator pedal system 40 and the foldable brake pedal system 50 are normal, the vehicle is normally kept in the manual driving mode or the mode is normally switched to the manual driving mode (step S6), and the control logic of the present disclosure is ended.

When a result of the determining in the autonomous driving determination step (step S5) indicates that the autonomous driving is possible, the mode of the vehicle is switched to the autonomous driving mode or the autonomous driving mode is maintained (step S7), and the vehicle moves to the nearest garage, a shoulder of the road, or a safety zone in a region in which the vehicle may autonomously travel in the autonomous driving state (step S8). After the vehicle moves, a gear shifting position of the vehicle changes to a park position (P-position), the vehicle is turned off, and the control logic of the present disclosure is ended.

Meanwhile, when a result of the determining in the autonomous driving determination step (step S5) indicates that the autonomous driving is impossible, a one-pedal activating step (step S9) of activating the one-pedal system using the foldable brake pedal system 50 according to an exemplary embodiment of the present disclosure is performed.

After the one-pedal activating step (step S9) is performed, a check step of checking whether a smart cruise control (SCC) system 110 of the vehicle may be used (step S10).

When the result of the determination in the check step (step S10) indicates that the smart cruise control system 110 may be used, the autonomous driving controller 20 automatically determines a traveling safety speed corresponding to a speed limit in consideration of one or more of a road condition (a general road, an expressway, and the like), speeds of peripheral vehicles, and weather situations (snow, rain, fog, and the like). The autonomous driving controller 20 performs a setting step (step S11) of setting the smart cruise control system 110 based on the determined traveling safety speed.

For example, the traveling safety speed may be set to 80 km/h when the vehicle travels on the general road with no traffic jam in a fine day, 80 km/h which is a speed reduced by 20% from the speed limit of 100 km/h when the vehicle travels on the expressway with no traffic jam in a rainy or snowy day, and 40 km/h when the peripheral vehicles travel at 40 km/h because of traffic jam.

After the smart cruise control system 110 is completely set in the setting step (step S11), the control logic according to an exemplary embodiment of the present disclosure performs a one-pedal control step (step S12) using the foldable brake pedal system 50. In the instant case, the one-pedal control step (step S12) corresponds to the one-pedal deceleration mode, and the driver receives visual and auditory activation information when the one-pedal deceleration mode is activated.

The one-pedal deceleration mode refers to a mode in which the vehicle decelerates or brakes when the driver presses and manipulates the foldable brake pedal, and the vehicle speed increases to the set safety speed and the vehicle accelerates when the driver eliminates the operating force (step S13).

In the one-pedal deceleration mode state, the vehicle moves to the nearest garage, the shoulder of the road, or the safety zone (step S8). After the vehicle moves, the gear shifting position of the vehicle changes to the park position (P-position), the vehicle is turned off, and the control logic of the present disclosure is ended.

Meanwhile, the result of the determination in the check step (step S10) indicates that the smart cruise control system 110 cannot be used, the control logic according to an exemplary embodiment of the present disclosure allows the vehicle to travel in the one-pedal deceleration mode state using the foldable brake pedal system 50 and move to the safety zone (step S8). After the vehicle moves, the gear shifting position of the vehicle changes to the park position (P-position), the vehicle is turned off, and the control logic of the present disclosure is ended.

Figure 4:
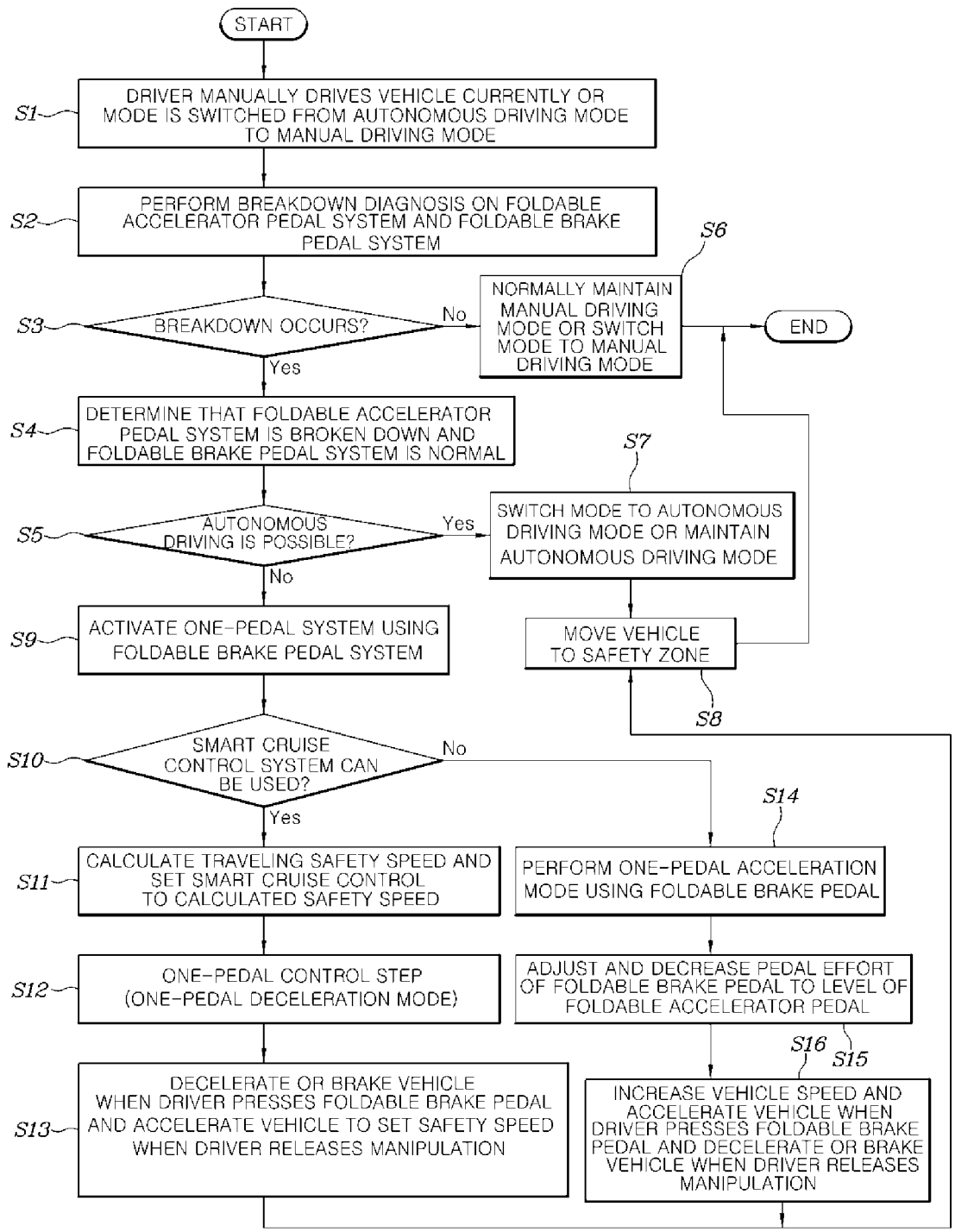

FIG. 4 is a flowchart for explaining a one-pedal control method for an autonomous vehicle according to various exemplary embodiments of the present disclosure.

Because steps S1, S2, and S13 of the control logic of the various exemplary embodiments are identical to those of the various exemplary embodiments described with reference to FIG. 3, a description thereof will be omitted. Step S14 and the following steps, which are different from the steps of the logic of the various exemplary embodiments of the present disclosure, will be described.

When the result of the determination in the check step (step S10) indicates that the smart cruise control system 110 cannot be used, the control logic of the various exemplary embodiments switches the mode to the one-pedal acceleration mode using the foldable brake pedal system 50 (step S14), and the driver receives visual and auditory activation information when the one-pedal acceleration mode is activated.

In a case in which a pedal effort of the foldable brake pedal system 50 may be adjusted when the vehicle operates in the one-pedal acceleration mode, the pedal effort of the foldable brake pedal system 50 is automatically decreased to a level of a pedal effort of the foldable accelerator pedal system 40 under the control of the foldable pedal controller 30 (step S15), reducing fatigue of the driver when the driver manipulates the pedal.

The one-pedal acceleration mode refers to a mode in which the vehicle speed increases and the vehicle accelerates when the driver presses and manipulates the foldable brake pedal 50, and the vehicle decelerates or brakes when the driver eliminates the operating force (step S16).

After step S16, the control logic according to an exemplary embodiment of the present disclosure allows the vehicle to travel in the one-pedal acceleration mode state using the foldable brake pedal system 50 and move to the safety zone (step S8). After the vehicle moves, the gear shifting position of the vehicle changes to the park position (P-position), the vehicle is turned off, and the control logic of the present disclosure is ended.

Figure 5:
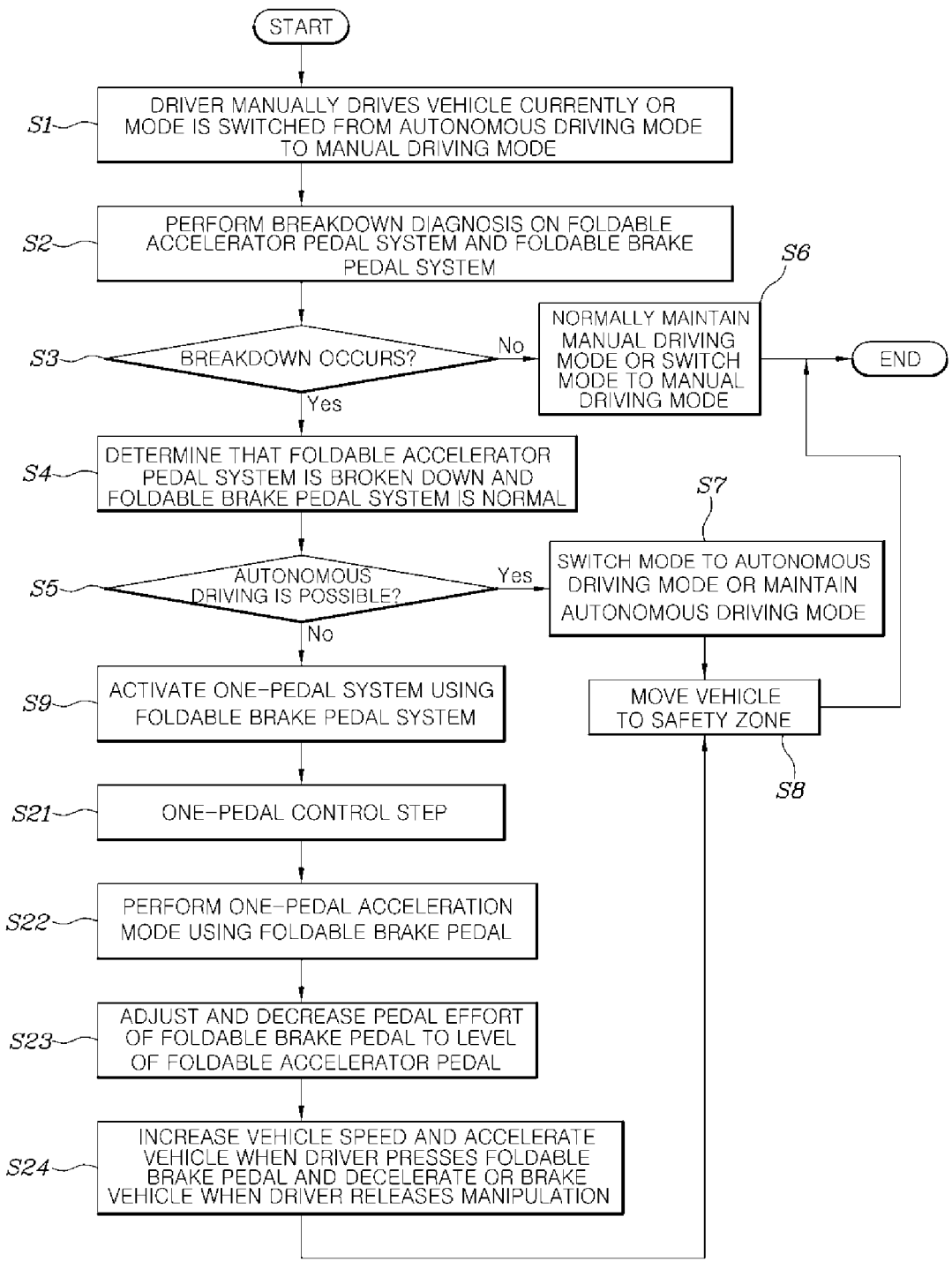

FIG. 5 is a flowchart for explaining a one-pedal control method for an autonomous vehicle according to various exemplary embodiments of the present disclosure.

Because steps S1 to S9 of the control logic of the various exemplary embodiments are identical to those of the various exemplary embodiments described with reference to FIG. 3, a description thereof will be omitted. Step S21 and the following steps, which are different from the steps of the logic of the various exemplary embodiments of the present disclosure, will be described.

According to the control logic of the various exemplary embodiments of the present disclosure, the one-pedal control step (step S21) using the foldable brake pedal system 50 is activated after the one-pedal activating step (step S9) is performed. In the instant case, the one-pedal control step (step S21) corresponds to the one-pedal acceleration mode (step S22), and the driver receives visual and auditory activation information when the one-pedal acceleration mode is activated.

In a case in which a pedal effort of the foldable brake pedal system 50 may be adjusted when the vehicle operates in the one-pedal acceleration mode, the pedal effort of the foldable brake pedal system 50 is automatically decreased to a level of a pedal effort of the foldable accelerator pedal system 40 under the control of the foldable pedal controller 30 (step S23), reducing fatigue of the driver when the driver manipulates the pedal.

The one-pedal acceleration mode refers to a mode in which the vehicle speed increases and the vehicle accelerates when the driver presses and manipulates the foldable brake pedal 50, and the vehicle decelerates or brakes when the driver eliminates the operating force (step S24).

After step S24, the control logic according to an exemplary embodiment of the present disclosure allows the vehicle to travel in the one-pedal acceleration mode state using the foldable brake pedal system 50 and move to the safety zone (step S9). After the vehicle moves, the gear shifting position of the vehicle changes to the park position (P-position), the vehicle is turned off, and the control logic of the present disclosure is ended.

According to the exemplary embodiment of the present disclosure described above, in the case in which the foldable accelerator pedal system 40 is broken down when the driver manually drives the vehicle or when the mode is switched from the autonomous driving mode to the manual driving mode, the driver may accelerate or decelerate the vehicle by use of the foldable brake pedal system 50. Therefore, it is possible to implement the fail-safe function by utilizing the integrated safety function of software instead of doubly configuring hardware to ensure redundancy, reducing the number of components and costs, ensuring convenience of use, and improving marketability.

In an exemplary embodiment of the present invention, the autonomous driving controller 20, the foldable pedal controller 30, the vehicle controller 60, the braking controller 90 and the driving motor controller 70 are integrated into a single controller.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A one-pedal control method for a vehicle, the one-pedal control method comprising:
   performing diagnosis on breakdown of a foldable accelerator pedal system and a foldable brake pedal system when a driver manually drives the vehicle currently or a mode of the vehicle is switched from an autonomous driving mode to a manual driving mode;
   determining whether autonomous driving of the vehicle is possible when it is determined that the foldable accelerator pedal system is broken down and the foldable brake pedal system is normal;
   activating a one-pedal system using the foldable brake pedal system when a result of the determining whether autonomous driving of the vehicle is possible indicates that the autonomous driving is impossible; and
   manipulating a foldable brake pedal in response to the driver's operation and controlling traveling of the vehicle after the one-pedal system using the foldable brake pedal system is activated,
   wherein in the manipulating a foldable brake pedal in response to the driver's operation and the controlling traveling of the vehicle after the one-pedal system using the foldable brake pedal system is activated, the vehicle decelerates or brakes in response that the driver presses and manipulates the foldable brake pedal, and a vehicle speed increases and the vehicle accelerates in response that the driver eliminates an operating force to the foldable brake pedal.

2. The one-pedal control method of claim 1, wherein the breakdown of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

3. The one-pedal control method of claim 1, wherein when a result of the performing diagnosis on breakdown of a foldable accelerator pedal system and a foldable brake pedal system indicates that the foldable accelerator pedal system and the foldable brake pedal system are normal, the vehicle is normally kept in the manual driving mode or the mode is normally switched to the manual driving mode.

4. The one-pedal control method of claim 1, wherein when the result of the determining whether autonomous driving of the vehicle is possible indicates that the autonomous driving is possible, the vehicle moves in an autonomous driving state to a predetermined zone.

5. The one-pedal control method of claim 1, wherein when the result of the determining whether autonomous driving of the vehicle is possible indicates that the autonomous driving is impossible, the vehicle travels in a one-pedal deceleration mode state using the foldable brake pedal system and moves to a predetermined zone.

6. The one-pedal control method of claim 1, including:
   checking whether a smart cruise control system is usable before the manipulating a foldable brake pedal in response to the driver's operation and controlling traveling of the vehicle after the one-pedal system using the foldable brake pedal system is activated, is performed after the activating a one-pedal system using the foldable brake pedal system; and
   determining a traveling safety speed and setting the smart cruise control system to the determined traveling safety speed when a result of the checking indicates that the smart cruise control system is usable,
   wherein when the setting of the smart cruise control system is completed, a one-pedal deceleration mode is performed, in which the vehicle decelerates or brakes in response that the driver presses and manipulates the foldable brake pedal, and the vehicle speed increases and the vehicle accelerates in response that the driver eliminates the operating force.

7. The one-pedal control method of claim 6, wherein the traveling safety speed in the determining a traveling safety speed and setting the smart cruise control system to the determined traveling safety speed, is a speed limit automatically determined by an autonomous driving controller of the vehicle in consideration of one or more of a road condition, a speed of a peripheral vehicle, and a weather situation.

8. The one-pedal control method of claim 6, wherein when the result of the checking whether a smart cruise control system is usable indicates that the smart cruise control system is not usable, a one-pedal acceleration mode using the foldable brake pedal is performed, and the one-pedal acceleration mode is a mode in which the vehicle speed increases and the vehicle accelerates in response that the driver presses and manipulates the foldable brake pedal, and the vehicle decelerates or brakes in response that the driver eliminates the operating force.

9. The one-pedal control method of claim 8, wherein control logic executing the one-pedal control method is ended after the vehicle travels in an one-pedal acceleration mode state and moves to a predetermined zone.

10. A one-pedal control method for a vehicle, the one-pedal control method comprising:
performing diagnosis on breakdown of a foldable accelerator pedal system and a foldable brake pedal system when a driver manually drives the vehicle currently or a mode of the vehicle is switched from an autonomous driving mode to a manual driving mode;
determining whether autonomous driving of the vehicle is possible when it is determined that the foldable accelerator pedal system is broken down and the foldable brake pedal system is normal;
activating a one-pedal system using the foldable brake pedal system when a result of the determining whether autonomous driving of the vehicle is possible indicates that the autonomous driving is impossible; and
manipulating a foldable brake pedal in response to the driver's operation thereof and controlling traveling of the vehicle after the one-pedal system using the foldable brake pedal system is activated,
wherein in the manipulating a foldable brake pedal in response to the driver's operation thereof and the controlling traveling of the vehicle after the one-pedal system using the foldable brake pedal system is activated, a vehicle speed increases and the vehicle accelerates in response that the driver presses and manipulates the foldable brake pedal, and the vehicle decelerates and brakes in response that the driver eliminates an operating force to the foldable brake pedal.

11. The one-pedal control method of claim 10, wherein the breakdown of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

12. The one-pedal control method of claim 10, wherein when a result of the performing diagnosis on breakdown of a foldable accelerator pedal system and a foldable brake pedal system indicates that the foldable accelerator pedal system and the foldable brake pedal system are normal, the vehicle is normally kept in the manual driving mode or the mode of the vehicle is normally switched to the manual driving mode.

13. The one-pedal control method of claim 10, wherein when a result of the determining whether autonomous driving of the vehicle is possible indicates that the autonomous driving is possible, the vehicle moves in an autonomous driving state to a predetermined zone.

14. The one-pedal control method of claim 10, wherein when a result of the determining whether autonomous driving of the vehicle is possible indicates that the autonomous driving is impossible, the vehicle travels in a one-pedal acceleration mode state using the foldable brake pedal system and moves to a predetermined zone.

15. A one-pedal control system configured to perform the control method of claim 1, the one-pedal control system comprising:
a foldable pedal controller configured to receive a request to check whether the one-pedal control system is abnormal from an autonomous driving controller when the driver manually drives the vehicle currently or when the mode of the vehicle is switched from the autonomous driving mode to the manual driving mode, the foldable pedal controller being configured to transmit a result of the diagnosis for the foldable accelerator pedal system and the foldable brake pedal system to the autonomous driving controller,
wherein when the result of the diagnosis indicates that the foldable accelerator pedal system is broken down and the foldable brake pedal system is normal, the autonomous driving controller is configured to determine whether the autonomous driving of the vehicle is possible,
wherein when a result of determining whether the autonomous driving of the vehicle is possible indicates that the autonomous driving is impossible, the one-pedal system is activated by use of the foldable brake pedal system, and
wherein when the result of determining whether the autonomous driving of the vehicle is possible indicates that the autonomous driving is possible, the mode of the vehicle is switched to the autonomous driving mode or the autonomous driving mode is maintained.

16. The one-pedal control system of claim 15, wherein the one-pedal system using the foldable brake pedal system is in a one-pedal deceleration mode in which the vehicle decelerates or brakes in response that the driver presses and manipulates the foldable brake pedal, and the vehicle speed increases and the vehicle accelerates in response that the driver eliminates the operating force.

17. The one-pedal control system of claim 15, wherein the one-pedal system using the foldable brake pedal system is in a one-pedal acceleration mode in which the vehicle speed increases and the vehicle accelerates in response that the driver presses and manipulates the foldable brake pedal, and the vehicle decelerates or brakes in response that the driver eliminates the operating force.

18. A one-pedal control system configured to perform the control method of claim 10, the one-pedal control system comprising:
a foldable pedal controller configured to receive a request to check whether the one-pedal control system is abnormal from an autonomous driving controller when the driver manually drives the vehicle currently or when the mode of the vehicle is switched from the autonomous driving mode to the manual driving mode, the foldable pedal controller being configured to transmit a result of the diagnosis for the foldable accelerator pedal system and the foldable brake pedal system to the autonomous driving controller,
wherein when the result of the diagnosis indicates that the foldable accelerator pedal system is broken down and the foldable brake pedal system is normal, the autonomous driving controller is configured to determine whether the autonomous driving of the vehicle is possible,
wherein when a result of determining whether the autonomous driving of the vehicle is possible indicates that the autonomous driving is impossible, the one-pedal system is activated by use of the foldable brake pedal system, and
wherein when the result of determining whether the autonomous driving of the vehicle is possible indicates that the autonomous driving is possible, the mode of the vehicle is switched to the autonomous driving mode or the autonomous driving mode is maintained.

19. The one-pedal control system of claim 18, wherein the one-pedal system using the foldable brake pedal system is in a one-pedal deceleration mode in which the vehicle decelerates or brakes in response that the driver presses and manipulates the foldable brake pedal, and the vehicle speed increases and the vehicle accelerates in response that the driver eliminates the operating force.

20. The one-pedal control system of claim 18, wherein the one-pedal system using the foldable brake pedal system is in a one-pedal acceleration mode in which the vehicle speed increases and the vehicle accelerates in response that the driver presses and manipulates the foldable brake pedal, and the vehicle decelerates or brakes in response that the driver eliminates the operating force.

* * * * *